Nov. 23, 1943.   I. ZUCKERMANN   2,334,802

FILTER

Filed Sept. 29, 1941

Isidore Zuckermann
INVENTOR.

BY
Victor J. Evans & Co.
ATTORNEYS

Patented Nov. 23, 1943

2,334,802

UNITED STATES PATENT OFFICE 2,334,802

FILTER

Isidore Zuckermann, New York, N. Y.

Application September 29, 1941, Serial No. 412,847

1 Claim. (Cl. 210—87)

This invention relates to filters of the type adapted to be attached to a faucet.

An object of the invention is to provide a filter having a casing for supporting nested filter cups and a housing removably connected to the top of the casing by a coarse screw thread to permit easy separation of the housing and casing to obtain access to the filter cups, the separable feature of the housing and casing permitting the latter to be detached when filtered water is not necessary, as for example, when washing dishes, vegetables and fruits.

A further object is to provide a filter of this character having a resilient gasket threadedly engaged with the neck of the housing and provided with a frustrum shaped resilient funnel disposed coaxial with the gasket adapted to receive faucets of various sizes and shapes.

A further object is to provide a device of this character having nested filter cups, preferably four in number, removably assembled in the casing and respectively from top to bottom containing cotton, finely ground charcoal, ground coke and coarsely ground charcoal, this arrangement of filtering material of this character in the order named promoting unrestricted velocity of the stream passing through the filter material.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming a part of this specification:

Figure 2:
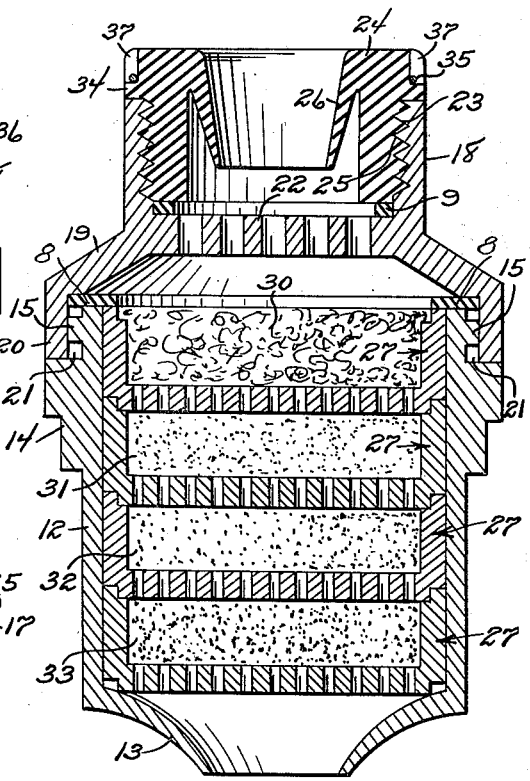
Figure 2 is a longitudinal sectional view taken on the line 2—2 of Figure 1.
Figure 3:
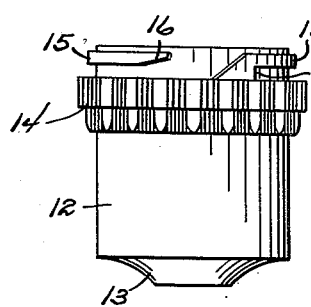
Figure 3 is a side elevation of the casing detached from the housing showing the coarse screw thread.

Referring now to the drawing in which like characters of reference designate similar parts in the various views, 10 designates a conventional faucet having a spout 11. In carrying out the invention a filter is provided comprising a cylindrical casing 12 which may be formed of any suitable material and which is provided at the bottom with a tapered spout 13 coaxial with the casing. As shown in Figure 2 the casing is provided on the outer surface with a knurled stepped boss 14 and above the boss is provided with a coarse thread 15 which is provided with a tapered entrance end 16 and terminates in a shoulder 17.

Figure 4:
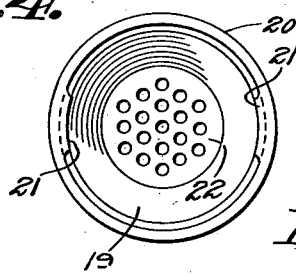
Figure 4 is a bottom plan view of the housing showing the tabs for engaging the thread of the casing.

A cylindrical housing 18 is provided with a flared skirt 19 having a cylindrical extension 20. At spaced points on the inner surface of the extension oppositely disposed tabs 21 project inwardly, see Figures 2 and 4. The tabs are adapted to be received by the coarse screw thread 15 when the casing 12 is turned axially to cause the tabs to mesh with the thread and detachably assemble the casing with the housing. One of the tabs engages with the shoulder 17 to limit turning movement of the housing on the casing when assembling the parts.

The housing 18 is provided with an integral perforated diaphragm 22 and above the diaphragm the housing is provided with an internal screw thread 23.

A cylindrical rubber gasket 24 is provided with an external screw thread 25 adapted to engage the screw thread 23 of the housing 18. The gasket is provided with a frustrum shaped integral funnel 26 coaxial with the gasket and tapered from its wide end at the top of the gasket to its small end near the bottom of the gasket, see Figure 2. The rubber funnel 26 may easily be deformed when the gasket is applied to a faucet to fit various shapes of faucets, such as faucets having cylindrical, or elongated flat spouts, or to fit spouts of different diameters. A rubber washer 9 is interposed between the gasket 24 and the perforated diaphragm 22.

Figure 5:
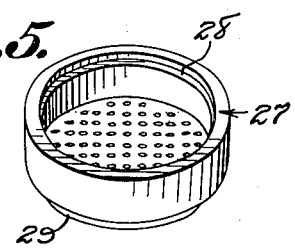
Figure 5 is a perspective view of one of the filter cups.

Removably disposed within the casing is a nested stack of filter cups 27 one of which is shown in Figure 5. The cups are formed of any desired material and are perforated in the bottom walls. Each cup is provided on the inner surface at the top with a shoulder 28 and is provided on the outer surface at the bottom with a shoulder 29. When the cups are stacked in the casing the shoulders of the cups interfit, see Figure 2. The uppermost cup is preferably filled with a filter element 30 formed of cotton batting. The filter elements of the cups underneath the uppermost cup is provided with filter elements arranged in the following order: from top to bottom respectively, finely ground charcoal 31, ground coke 32, and coarsely ground charcoal 33. The finely ground charcoal first encounters the stream of water when the velocity is greatest and is intended to more appreciably slow up the velocity of the stream. The next underneath filter element being formed of ground coke has larger interstices between the particles substantially maintains the same velocity of the water as exists when the water leaves the finely ground charcoal. The lowermost filter element of coarsely ground charcoal has a still large interstice between the particles maintains the same velocity of the water when leaving the ground coke filter.

Figure 1:
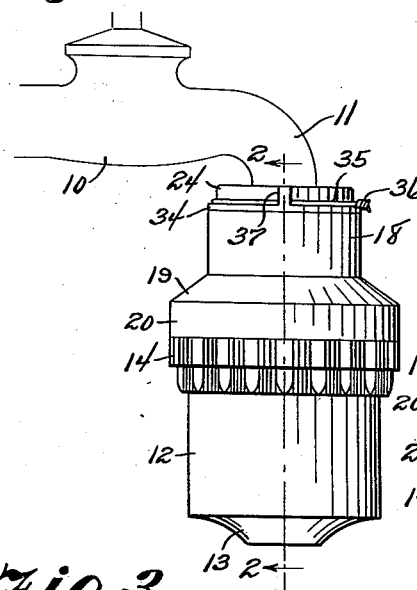
Figure 1 is a side elevation of a filter constructed in accordance with the invention attached to a faucet.

To assure the gasket 24 being clamped water tight to the spout 11 of the faucet a flange 34 is formed on the outer surface of the gasket and is adapted to be supported on the upper edge of the housing 18, see Figure 2. A clamp wire 35 is wrapped in a single convolution around the outer surface of the housing above the flange 34 and the ends are twisted together as shown at 36 in Figure 1. At diametrically opposite points, lugs 37 are formed integral with the housing and the clamp wire passes through these lugs to be permanently assembled with the gasket.

A rubber washer 8 is disposed between the housing and the casing to prevent water from leaking or spouting out.

In operation the threaded joint between the casing and the housing permits the casing being detached with the nested filter cups carried as a unit therein when filtered water is not desired, as for example, when washing the hands or washing the dishes. Also the cotton filter element may be easily accessible when the casing is removed from the housing to permit a fresh supply of cotton being applied in the uppermost filter cup. When the stream of water passes through the various filter cups impurities will be removed while at the same time beneficial characteristics of the water, such as suspended salts and other beneficial ingredients will be in no wise interfered with.

From the above description it is thought that the construction and operation of the invention will be fully understood without further explanation.

What is claimed is:

In a filter device, a tubular casing having a discharge opening in its lower end, the said casing being adapted to accommodate a plurality of stacked filter sections therein, a cover section mounted on the casing having a cylindrical interiorly threaded body of a diameter smaller than the diameter of the casing, a flaring skirt depending from the body and having a cylindrical flange at the bottom encircling the upper portion of the casing, a screw connection for joining the said cover flange with the casing, a perforated transverse partition at the bottom of the cover body, a resilient tubular gasket fitted into the cover body and having screw thread connection therewith, and a wire encircling the upper projecting portion of the gasket for tightly fitting the same on a faucet.

ISIDORE ZUCKERMANN.